(12) United States Patent
Chow et al.

(10) Patent No.: US 8,611,675 B2
(45) Date of Patent: Dec. 17, 2013

(54) CONFUSION MATRIX FOR CLASSIFICATION SYSTEMS

(75) Inventors: Jyh-Herng Chow, San Jose, CA (US); Byron Dom, Los Gatos, CA (US); Dao-I Lin, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1286 days.

(21) Appl. No.: 11/644,172

(22) Filed: Dec. 22, 2006

(65) Prior Publication Data

US 2008/0154807 A1  Jun. 26, 2008

(51) Int. Cl.
*G06K 9/62* (2006.01)
(52) U.S. Cl.
USPC ........... 382/224; 382/156; 382/155; 382/170; 382/104; 382/181
(58) Field of Classification Search
USPC .................. 382/159, 224, 155, 170, 104, 181
See application file for complete search history.

(56) References Cited

U.S. PATENT DOCUMENTS

| | | | |
|---|---|---|---|
| 6,301,579 B1 * | 10/2001 | Becker | 707/102 |
| 2005/0286772 A1 * | 12/2005 | Albertelli | 382/224 |
| 2006/0047617 A1 * | 3/2006 | Bacioiu et al. | 706/59 |

* cited by examiner

*Primary Examiner* — Ruiping Li
(74) *Attorney, Agent, or Firm* — Hickman Palermo Truong Becker Bingham Wong LLP

(57) ABSTRACT

Techniques are described herein for generating and displaying a confusion matrix wherein a data item belonging to one or more actual classes is predicted into a class. The classes in which the data item may be predicted (the "predicted classes") are ranked according to a score that in one embodiment indicates the confidence of the prediction. If the data item is predicted into a class that is one of the top K ranked predicted classes, then the prediction is considered accurate and an entry is created in a cell of a confusion matrix indicating the accurate prediction. If the data item is not predicted into a class that is not one of the top K ranked predicted classes, then the prediction is considered inaccurate and an entry is created in a cell of a confusion matrix indicating the inaccurate prediction.

40 Claims, 8 Drawing Sheets

| docid | forecast | spaceid | value | title | description |
|---|---|---|---|---|---|
| 406 | male | 2 | Female | TAG Heuer 2000 Midsize Steel Watch | Intense moves...midsize 2000 Series watch from TAG Heuer in premium grade steel. Durable case and bracelet are crafted from a solid steel block. Triple link brushed and polished steel bracelet is fully integrated into the brushed steel case. Brushed unidirectional rotating bezel with polished riders and engraved markers. Silvery white dial with luminous hands and hour markers. |
| 656 | male | 2 | Female | TAG Heuer 2000 Women's Steel Watch | Raise the performance level....dynamic women's timepiece from the 2000 Exclusive series. High performance stainless steel case is cut from solid block of steel and highly polished to a lustrous finish. Case is presented on the ultra-sleek, updated metal link bracelet in brushed and polished steel. Brushed and polished unidirectional bezel has 12 sides and engraved markers. Striking black dial with luminous hands and silver colored hour markers. |

Error: <5% <10% <15% <20% above
(click on an error cell to see the documents)

| A\F | Art | Bea | Bus | Car | Com | Con | Din | Edu | Ent | Fam | Foo | Gam | Health | Hom | Loc | New | Pets | Pol | Pre | Sci |
|---|---|---|---|---|---|---|---|---|---|---|---|---|---|---|---|---|---|---|---|---|
| Art (11) | 780 | 8 | 30 | 8 | 35 | 21 | 1 | 54 | 69 | 24 | 5 | 8 | 7 | 21 | 2 | 4 | 8 | 41 | 7 | 35 |
| Bea (4) | 13 | 479 | 14 | 4 | 7 | 0 | 1 | 3 | 13 | 16 | 2 | 7 | 40 | 13 | 2 | 0 | 0 | 1 | 5 | 5 |
| Bus (15) | 32 | 23 | 1454 | 45 | 60 | 6 | 10 | 35 | 16 | 22 | 11 | 19 | 9 | 17 | 16 | 3 | 17 | 102 | 3 | 14 |
| Car (48) | 7 | 6 | 56 | 3052 | 22 | 25 | 4 | 12 | 17 | 7 | 1 | 8 | 6 | 15 | 3 | 7 | 9 | 21 | 4 | 33 |
| Com (11) | 35 | 7 | 53 | 15 | 962 | 80 | 3 | 17 | 22 | 7 | 3 | 36 | 4 | 5 | 4 | 7 | 1 | 16 | 0 | 16 |
| Con (10) | 15 | 0 | 12 | 36 | 53 | 796 | 0 | 5 | 11 | 2 | 7 | 31 | 1 | 7 | 0 | 0 | 0 | 3 | 0 | 5 |
| Din (93) | 12 | 4 | 28 | 2 | 5 | 0 | 1065 | 4 | 21 | 29 | 120 | 13 | 8 | 5 | 37 | 1 | 2 | 13 | 9 | 14 |
| Edu (12) | 89 | 16 | 63 | 10 | 14 | 2 | 1 | 466 | 57 | 10 | 8 | 10 | 17 | 4 | 1 | 2 | 5 | 31 | 19 | 105 |
| Ent (9) | 75 | 14 | 11 | 13 | 14 | 19 | 2 | 39 | 918 | 23 | 6 | 18 | 10 | 7 | 3 | 13 | 8 | 17 | 8 | 21 |
| Fam (5) | 15 | 14 | 15 | 1 | 9 | 0 | 5 | 6 | 16 | 815 | 2 | 3 | 22 | 2 | 2 | 0 | 2 | 17 | 21 | 5 |
| Foo (6) | 7 | 3 | 10 | 3 | 3 | 3 | 35 | 9 | 7 | 6 | 613 | 1 | 31 | 4 | 4 | 2 | 11 | 0 | 7 | 20 |
| Gam (7) | 16 | 6 | 12 | 17 | 28 | 33 | 2 | 5 | 26 | 4 | 1 | 616 | 3 | 19 | 2 | 0 | 2 | 8 | 10 | 15 |
| Health (17) | 11 | 67 | 14 | 2 | 5 | 0 | 3 | 5 | 8 | 30 | 34 | 2 | 1297 | 8 | 3 | 0 | 9 | 5 | 64 | 84 |
| Hom (5) | 13 | 9 | 17 | 12 | 8 | 4 | 1 | 2 | 3 | 3 | 9 | 12 | 3 | 458 | 1 | 0 | 16 | 2 | 3 | 36 |
| Loc (93) | 30 | 46 | 17 | 31 | 31 | 9 | 77 | 14 | 21 | 14 | 14 | 14 | 4 | 38 | 113 | 4 | 5 | 27 | 5 | 20 |
| New (2) | 9 | 0 | 2 | 2 | 5 | 0 | 0 | 3 | 12 | 0 | 0 | 0 | 3 | 0 | 0 | 63 | 0 | 0 | 0 | 8 |
| Pets (5) | 4 | 3 | 7 | 2 | 0 | 1 | 0 | 1 | 8 | 4 | 8 | 2 | 12 | 8 | 0 | 0 | 597 | 1 | 6 | 46 |
| Pol (8) | 51 | 2 | 101 | 23 | 11 | 2 | 1 | 13 | 13 | 26 | 2 | 11 | 9 | 3 | 5 | 27 | 2 | 726 | 9 | 22 |
| Pre (7) | 8 | 8 | 10 | 4 | 3 | 1 | 0 | 9 | 6 | 37 | 5 | 6 | 86 | 4 | 2 | 2 | 5 | 10 | 473 | 9 |
| Sci (13) | 44 | 15 | 18 | 40 | 17 | 7 | 6 | 73 | 18 | 2 | 22 | 12 | 106 | 66 | 2 | 9 | 78 | 17 | 8 | 1269 |

FIG. 4B

| A \ F | Art | Bea | Bus | Car | Com | Con | Din | Edu | Ent | Fam | Foo | Gam | Health | Hom | Loc | New | Pets | Pol | Pre | S |
|---|---|---|---|---|---|---|---|---|---|---|---|---|---|---|---|---|---|---|---|---|
| Art (11) | 1100 | 6 | 17 | 4 | 12 | 2 | 0 | 19 | 22 | 7 | 2 | 3 | 4 | 10 | 1 | 0 | 3 | 18 | 5 |  |
| Bea (4) | 2 | 613 | 5 | 1 | 2 | 0 | 1 | 0 | 2 | 1 | 1 | 2 | 4 | 2 | 0 | 0 | 0 | 1 | 1 |  |
| Bus (15) | 15 | 6 | 1816 | 10 | 21 | 3 | 3 | 15 | 9 | 7 | 5 | 9 | 1 | 7 | 4 | 1 | 17 | 33 | 1 |  |
| Car (46) | 4 | 4 | 16 | 3349 | 10 | 4 | 2 | 7 | 7 | 4 | 0 | 3 | 4 | 7 | 2 | 2 | 5 | 5 | 3 |  |
| Com (11) | 14 | 3 | 22 | 8 | 1218 | 24 | 1 | 12 | 8 | 1 | 2 | 17 | 3 | 3 | 2 | 3 | 1 | 7 | 0 |  |
| Con (10) | 2 | 0 | 6 | 6 | 14 | 953 | 0 | 7 | 1 | 0 | 1 | 3 | 0 | 3 | 0 | 0 | 0 | 2 | 0 |  |
| Din (93) | 8 | 3 | 16 | 2 | 5 | 0 | 152 | 1 | 12 | 18 | 72 | 10 | 8 | 4 | 6 | 0 | 2 | 11 | 8 |  |
| Edu (12) | 36 | 9 | 24 | 5 | 11 | 1 | 1 | 789 | 30 | 6 | 5 | 7 | 10 | 4 | 1 | 1 | 4 | 15 | 15 |  |
| Ent (9) | 29 | 5 | 2 | 8 | 8 | 6 | 1 | 15 | 1151 | 10 | 3 | 9 | 4 | 3 | 1 | 9 | 2 | 11 | 4 |  |
| Fam (5) | 8 | 4 | 4 | 1 | 2 | 0 | 0 | 2 | 6 | 856 | 0 | 3 | 10 | 0 | 0 | 0 | 1 | 3 | 8 |  |
| Foo (6) | 4 | 1 | 1 | 2 | 1 | 0 | 4 | 7 | 5 | 1 | 2729 | 0 | 5 | 3 | 3 | 0 | 4 | 0 | 4 |  |
| Gam (7) | 7 | 1 | 4 | 8 | 7 | 2 | 1 | 3 | 13 | 1 | 1 | 821 | 1 | 5 | 2 | 0 | 2 | 1 | 5 |  |
| Health (17) | 5 | 17 | 8 | 0 | 0 | 0 | 2 | 2 | 6 | 12 | 8 | 1 | 1577 | 4 | 2 | 0 | 3 | 3 | 19 |  |
| Hom (5) | 3 | 2 | 8 | 2 | 3 | 2 | 1 | 1 | 1 | 1 | 3 | 2 | 2 | 600 | 1 | 0 | 5 | 0 | 1 |  |
| Loc (93) | 17 | 34 | 6 | 25 | 29 | 7 | 24 | 9 | 13 | 8 | 11 | 9 | 3 | 32 | 508 | 2 | 4 | 24 | 3 |  |
| New (2) | 4 | 0 | 0 | 2 | 3 | 0 | 0 | 1 | 8 | 1 | 1 | 0 | 2 | 0 | 0 | 143 | 0 | 15 | 0 |  |
| Pets (5) | 1 | 0 | 0 | 0 | 0 | 1 | 0 | 0 | 2 | 1 | 0 | 1 | 3 | 1 | 3 | 0 | 712 | 0 | 0 |  |
| Pol (8) | 15 | 0 | 41 | 10 | 5 | 0 | 0 | 9 | 9 | 9 | 0 | 6 | 4 | 3 | 0 | 5 | 1 | 991 | 4 |  |

Error: <5%  <10%  <15%  <20%  above (click on an error cell to see the documents)

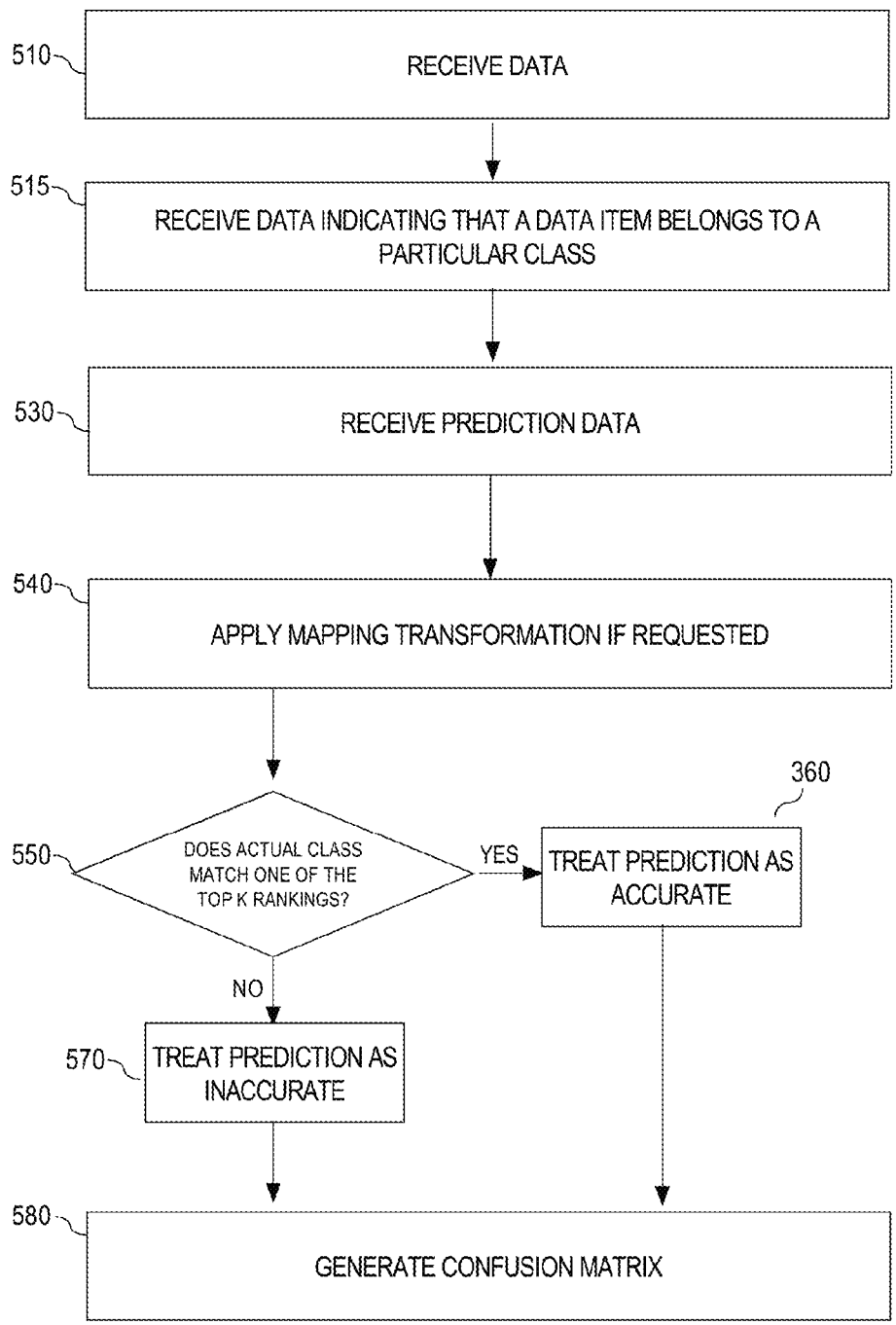

CONFUSION MATRIX FOR CLASSIFICATION SYSTEMS

FIELD OF THE INVENTION

The present invention relates to classification analysis and, more specifically, to generating and displaying a confusion matrix to display the results of a classification.

BACKGROUND

A confusion matrix is a visualization and diagnostic tool typically used to evaluate the effectiveness of a trained classifier, which is a software tool that receives data ultimately belonging to one or more categories as input and predicts it into one of the categories. A classifier is trained with data, the actual category of which is known, and by evaluating the classifier's performance with this known data, the algorithms used by the classifier to predict data is altered to provide optimal performance with future data, the category of which is unknown.

There are disadvantages to the above approach, especially when there are multiple classes acceptable for a prediction. In this case, a classification may be labeled as being in error, when in fact, the classification is acceptable and the classification should not be used as an example of inaccurate performance.

Another disadvantage exists when there are numerous classes and subclasses comprising the confusion matrix, because the display of the confusion matrix may become so large as to be unwieldy to display and use for evaluation. For example, a confusion matrix comprising 1000 rows and 1000 columns would be too large to fit on a typical screen.

Therefore, an approach for generating and displaying a confusion matrix, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram illustrating an example of a listing of mispredicted documents according to an embodiment of the invention;

FIG. 4A is a block diagram illustrating a confusion matrix where K=1 according to an embodiment of the invention;

FIG. 4B is a block diagram illustrating a confusion matrix where K=5 according to an embodiment of the invention;

FIG. 5 is a flowchart illustrating the functional steps of generating and displaying a confusion matrix according to an embodiment of the invention.

DETAILED DESCRIPTION

Figure 1:
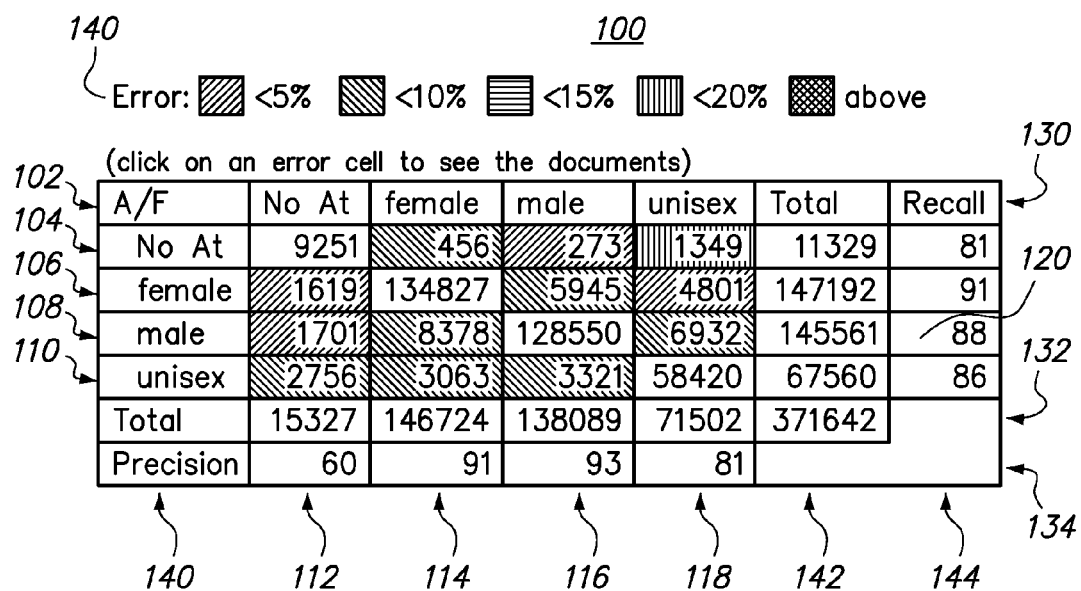
FIG. 1 is a block diagram illustrating an example embodiment of a confusion matrix.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein for generating and displaying a confusion matrix wherein a data item belonging to one or more actual classes is predicted into a class. The classes in which the data item may be predicted (the "predicted classes") are ranked according to a score that in one embodiment indicates the confidence of the prediction. According to an embodiment, the prediction is made by a classifier. If the data item is predicted into a class that is one of the top K ranked predicted classes, then the prediction is considered accurate and an entry is created in a cell of a confusion matrix indicating the accurate prediction; for example, a cell corresponding to the row associated with the actual class and the column corresponding to the predicted class that equals the actual class. If the data item is not predicted into a class that is not one of the top K ranked predicted classes, then the prediction is considered inaccurate and an entry is created in a cell of a confusion matrix indicating the inaccurate prediction; for example, a cell corresponding to the row associated with the actual class and the column corresponding to the highest ranked predicted class that does not equal the actual class.

According to an embodiment, data is received that identifies a plurality of classes, along with data that indicates that a data item has been designated as belonging to a particular class of the plurality of classes. Data is then received that indicates that a prediction has been made that the data item belongs to a class from a ranked set of predicted classes, wherein the ranked set of predicted classes for the data item is a subset of the plurality of classes. If the particular class matches one of the top K classes in the ranked set of predicted classes, then the prediction is treated as accurate.

According to an embodiment, data is received that indicates a plurality of classes, along with data that indicates that a data item has been designated as belonging to a particular class of the plurality of classes, and data that indicates that a prediction has been made that the data item belongs to a class from a ranked set of predicted classes, wherein the ranked set of predicted classes for the data item is a subset of the plurality of classes and the ranked set of predicted classes is ranked according to score information generated by one or more classifiers. If the particular class matches one of the top K classes in the ranked set of predicted classes, then the prediction is treated as accurate. If the particular class does not match one of the top K classes in the ranked set of predicted classes, then the prediction is treated as inaccurate. A confusion matrix is generated wherein an accurate prediction is represented in a particular cell of the confusion matrix that identifies a match between the particular class and the class in the ranked set of predicted classes that matches the particular class, and wherein an inaccurate prediction is represented in a particular cell of the confusion matrix that identifies a mismatch between the particular class and the class in the ranked set of predicted classes that matches the particular class.

According to an embodiment, data is received identifying a plurality of actual and predicted classes, wherein at least one of the actual classes is comprised of a plurality of subclasses. A confusion matrix is generated and displayed comprising rows, columns, and cells defined by the intersection of the rows and columns. In response to user input, for example a mouse click on a graphical element, the confusion matrix is updated to include at least one additional row representing each subclass of the actual classes and the display of the confusion matrix is updated to reflect the additional row.

Generating and Displaying a Confusion Matrix

In traditional supervised learning approaches, a classifier is trained with labeled data, where each piece of the training data is labeled with one class, and the classifier predicts a single class with a confidence score or similar approach to allow ranking of the predicted classes. After a classifier is trained, a labeled test data set is predicted to evaluate the trained classifier. A confusion matrix is a commonly used visual diagnostic aid to evaluate the performance of a trained classifier. FIG. 1 is a block diagram 100 illustrating an example embodiment of a confusion matrix 102. Rows A of the matrix 104-110 represent the actual classes of the data, while columns F of the matrix 112-118 represent the predicted classes of the data. The values in cells 120 (A, F) of the matrix defined by the rows 104-110 (A) and columns 112-118 (F) indicate the number of examples with actual class A that have been predicted into class F. Cells 120 on the diagonal represent correct predictions, while off-diagonal cells 120 indicate mispredictions. The confusion matrix 102 may be configured in reverse, with the rows representing the predicted classes and the columns representing the actual classes.

In FIG. 1, an example confusion matrix 102 is illustrated wherein data is being classified into genders. The available classes include "No At" (which stands for "No Attribute," which in this example of product gender information means that the product does not have a specific gender attribute), male, female, and unisex. Header rows 130-134 and columns 140-144 may be used to aid in reading the matrix and contain information about the categories, the total number of data items, and the accuracy of the predictions. For example, there are 5945 examples whose actual class is "female" but have been predicted into the "male" class. According to an embodiment, color coding or other visual indicators may be used to identify the degree of confusion between categories; which is, how often one class is predicted into another class. FIG. 1 illustrates different shadings in cells 120 corresponding to varying levels of confusion, and a legend 140 is utilized to aid in comprehending the visual indicators. For example, it may be quickly understood that the class "No At" is often mispredicted into the "unisex" class, because the shading in the cell defined by the "No At" row 104 and "unisex" column 118 corresponds to between a ten and fifteen percent error rate.

According to an embodiment, the data in each cell 120 may be "linked" to all documents comprising that data. This may be accomplished, for example, through the use of HTML and hyperlinking. For example, a user may click on the "5945" displayed in the cell defined by the "female" actual class 106 and "male" predicted class 116 and a listing will be presented of all the actual data elements comprising the 5945 mispredicted documents.

FIG. 2 is a block diagram 200 illustrating an example of a listing of mispredicted documents 202. According to an embodiment, the data may be presented in tabular form, with headings such as a document ID 204 that may serve as a key value, a forecast column 206 that indicates which class the document was forecast into, a category identification value 208, an actual column 210 that identifies the actual class to which the document belongs, a title 212 for the document that may correspond to a hyperlink title on a web page, for example, and a description 214 column. The listing 202 may also be generated for correctly predicted documents, and elements of the listing may comprise more or less of the elements illustrated in FIG. 2. According to an embodiment, the listing 202 is in HTML format and may contain hyperlinks which, when clicked, direct the user to more detailed data regarding the document.

Interactive Confusion Matrix

A confusion matrix may be too large to display in a manner conducive to efficient viewing. According to an embodiment, an interactive confusion matrix is provided where the confusion matrix is initially displayed with only the top-level classes and predictions to any subclasses within the top-level classes are contracted into the top-level classes.

Figure 3A:
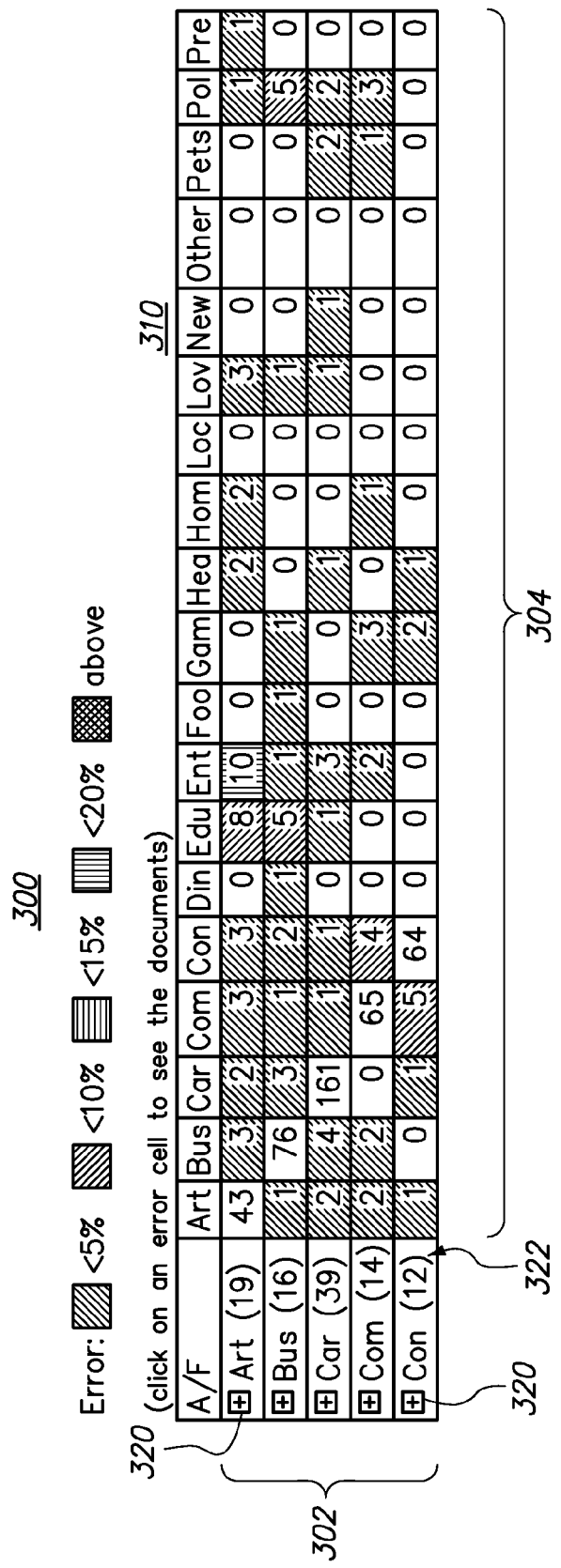
FIG. 3A is a block diagram illustrating a contracted confusion matrix according to an embodiment of the invention.

FIG. 3A is a block diagram illustrating a contracted confusion matrix 310 according to an embodiment of the invention. The confusion matrix is made of a plurality of actual classes and predicted classes. While in this example the actual classes comprise rows 302 of the confusion matrix 310 and the predicted classes comprise the columns 304 of the confusion matrix 310, the confusion matrix 310 may be configured in reverse. According to an embodiment, at least one of the actual classes is broken down into subclasses, while in other embodiments at least one of the predicted classes are also broken down into subclasses. According to an embodiment, the actual classes and predicted classes have the same subclasses. According to an embodiment, a graphical indicator 320 is displayed next to the actual class name to indicate that the actual class in is contracted display mode, while in other embodiments a graphical indicator 320 may be displayed next to the predicted class name in addition or exclusively. According to an embodiment, a user may activate the graphical indicator 320, for example with a mouse click, and in response, the confusion matrix display will be altered as described further below. According to an embodiment, the number of subclasses contained within a class may be displayed 322 in the confusion matrix, for example by listing the number of subclasses or with another type of visual indicator.

While in the contracted state, the values in the cells defined by the actual and predicted classes represent the number of examples with actual class A that have been predicted into class F, where the actual class and predicted class includes all subclasses. For example, the "Art" actual class has been correctly predicted into the "Art" predicted class 43 times and incorrectly predicted into the "Bus" predicted class 3 times. The "Art" actual class has a graphical indicator 320 displayed in proximity to the class name, which according to this embodiment means that the "Art" actual class has subclasses. These subclasses are not displayed in the contracted state, and the values for the 43 correct predictions and the 3 incorrect predictions include all values for the subclasses that comprise the "Art" actual class.

Figure 3B:
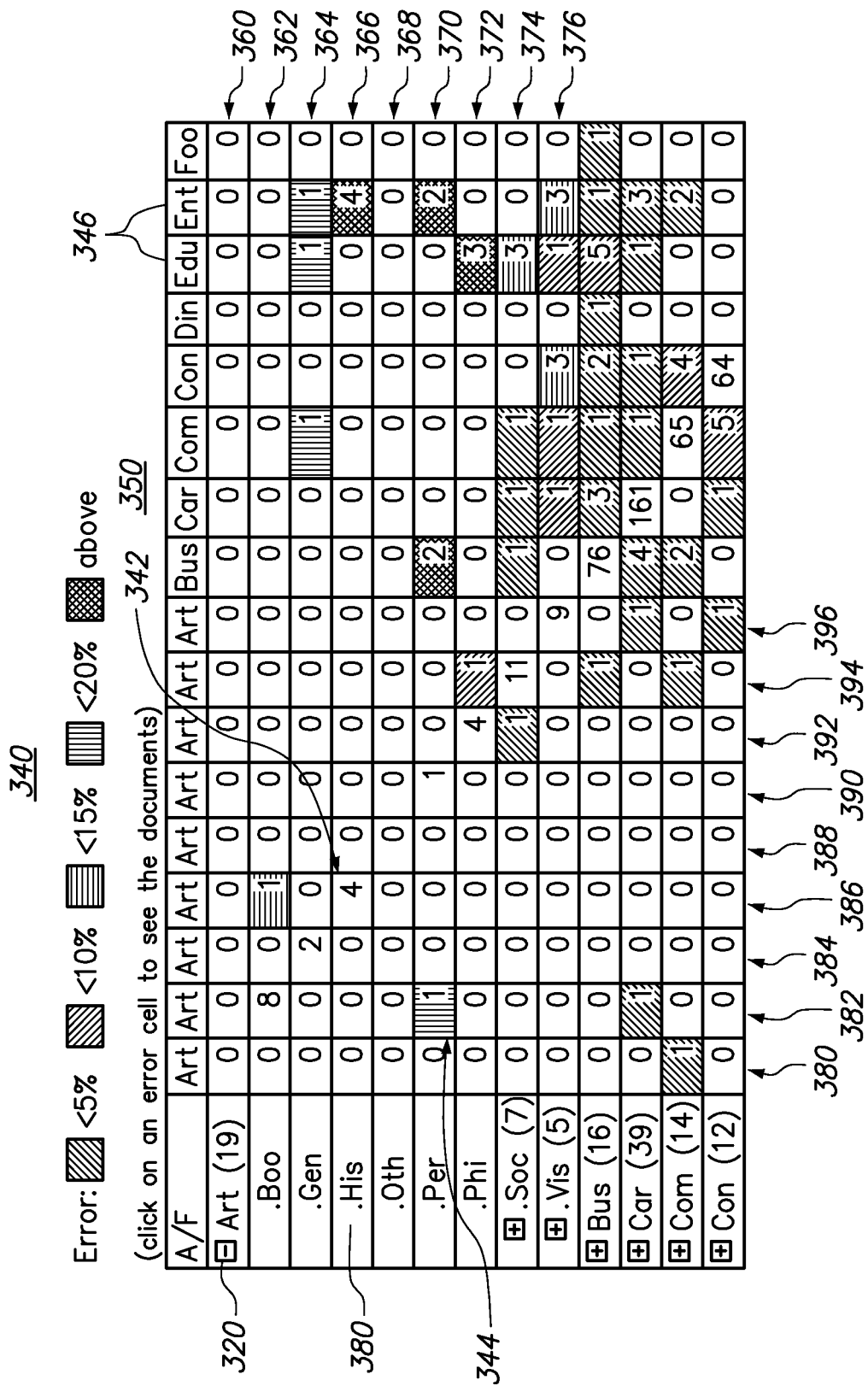
FIG. 3B is a block diagram illustrating an expanded confusion matrix according to an embodiment of the invention.

FIG. 3B is a block diagram 340 illustrating an expanded confusion matrix 310 according to an embodiment of the invention. In FIG. 3B, the row in which the "Art" actual class exists 360 has been expanded and the display of the confusion matrix 350 updated to display the additional rows 362-376 comprising the subclasses of the "Art" class, and the column in which the "Art" predicted class is displayed has been expanded to display the additional columns 380-396 comprising the subclasses of the "Art" class. According to an embodiment, subclasses of a class may have any number of subclasses, and these sub-sub-classes may have any number of subclasses. The operation and display of these sub-sub-classes will operate in the same manner as described herein. According to an embodiment, this expansion and resultant update of the display of the confusion matrix 350 is in response to user input directed to the graphical element 320 located in proximity to the actual or predicted class name. According to an embodiment, the graphical element 320 has changed appearance to indicate that the row has been expanded, and that a second user input now directed to the graphical element 320 will cause the row to contract as illustrated in FIG. 3A. According to an embodiment, the subclass names 380 may be indented or otherwise displayed in a manner indicating that the subclasses belong to a particular class. While in FIG. 3B the rows and columns corresponding to the "Art" class have been expanded, the columns associated with the "Art" predicted class and subclasses may be expanded to the exclusion of the rows associated with the "Art" actual class, and vice versa.

As FIG. 3B illustrates, the 43 instances of documents belonging to the "Art" actual class being correctly predicted into the "Art" predicted class are now broken down into subclasses. Cells along the diagonal 342 represent instances in which a document belonging to a particular subclass of the "Art" class, for example the ".His" subclass, was correctly predicted into the particular actual subclass. Cells not along the diagonal 344 represent instances in which a document was correctly predicted into the "Art" class, but predicted into the incorrect subclass. For example, one document belonging to the ".Per" subclass of the "Art" class was incorrectly predicted into the ".Boo" subclass. While the ".Boo" subclass is not displayed in the column headers 346, it may be determined that a particular column header belongs to a particular subclass by counting the rows and columns. According to an embodiment, the column headers 346 may be expanded to fully display the names of the subclasses and a visual indicator may automatically appear in response to user input, such as hovering a cursor over the column header 346.

In FIG. 3A, the incorrect prediction of the one document belonging to the ".Per" subclass of the "Art" class into the ".Boo" subclass is registered as a correct prediction, because the document was predicted into the correct class. However, as FIG. 3B illustrates, the use of an expanding confusion matrix display enables a more thorough analysis of classifier performance. According to an embodiment, a cell in the contracted or expanded confusion matrix may, when clicked, direct the user to more detailed data regarding the particular documents comprising the result in the particular cell.

Generating and Displaying a Top-K Confusion Matrix

Often, there are multiple classes acceptable for a prediction, and traditional approaches of predicting a document or data into one class leads to inaccurate and skewed results. According to an embodiment, a transformation is applied to a classification result wherein a prediction that falls within the top K classes is regarded as a correct prediction. K is a variable, most often an integer, and the "K" nomenclature has no independent significance. For example, if K=5, then a prediction that falls within the top 5 classes is regarded as a correct prediction. According to an embodiment, a classifier produces score information for every class in a prediction. This score information may be the level of confidence the classifier has in the prediction for each class, or may be the likelihood that the data belongs to each class, according to an embodiment.

According to an embodiment, one approach may be described mathematically. If the classifier produces score information for every class in a prediction, then define $S_i$ as $S_1, S_2, \ldots, S_n$, where S is the score information and i is the ranking of the score within the prediction. Given a piece of data where A is its actual class and F is the forecast class, define $S_i$ to be the prediction score of class i by the classifier. In a traditional confusion matrix generation, F is the class i with the highest score. To generate and display a Top-K confusion matrix, according to an embodiment, first sort $\{S_i$ for all i$\}$, then if the score of A is in the highest K scores, then set F=A; otherwise, set F to be the class with the highest score. This set of data is then used to generate a confusion matrix.

FIG. 4A is a block diagram illustrating a confusion matrix where K=1, and FIG. 4B is a block diagram illustrating a confusion matrix where K=5. It may be observed that the confusion matrix in FIG. 4B provides a much clearer view of misprediction errors. According to an embodiment, user input may be received for the value of K, and a confusion matrix may be generated and displayed according to the K value as described herein. According to an embodiment, user input be received for the value of K and an existing confusion matrix may be automatically updated to reflect the new K value, such as updating the values in each cell of the confusion matrix. For a data item that belongs to more than one actual class, the calculation of the top-K classes would include each actual class for which the data item belongs.

Category Mapping and Transformations

According to an embodiment, a custom-defined mapping function may be applied, where categories in one taxonomy can be mapped into categories in another taxonomy. Various transformations on the confusion matrix may be applied by defining the mapping through a mapping file. A record, (A,F) in an original view will become a record, (map(A), map(F)) in a transformed view. For example, in a shopping product categorizer, to view the confusion matrix in a CPC (cost per click) taxonomy, a file may be defined as:

| | |
|---|---|
| 95939924 | 0.19 |
| 96071343 | 0.19 |
| 95940665 | 0.19 |
| 95972614 | 0.25 |
| 96071451 | 0.19 |
| 95939952 | 0.38 |
| ... | | where the first column is a category identification (from one taxonomy) and the second column is the CPC rate (into another taxonomy). When this mapping is applied to a confusion matrix, the confusion matrix will be transformed into a CPC-based view.

Operational Example

FIG. 5 is a flowchart illustrating the functional steps of generating and displaying a confusion matrix, according to an embodiment of the invention. Although steps are depicted in FIG. 5 in a particular order, in other embodiments the steps, or a subset of the steps, may be performed in a different order or overlapping in time.

In step 510, data is received identifying a plurality of classes and data records, such as a set of data records with actual class associated with each record. This may comprise data indicating actual classes, predicted classes, and classifier prediction results for each class with its score as discussed herein. In step 515, data is received that indicates that a data item has been designated as belonging to one of the plurality of classes. For example, each data item is identified as belonging to an "actual" class. In step 530, data is received that indicates that a prediction has been made that the data item belongs to a class from a ranked list of classes. According to an embodiment, the list of predicted classes for the data item is ranked. According to one embodiment, the ranking is based upon score information for each predicted class, which is a gauge of the accuracy of the prediction. For example, if the classifier produces score information for every class in a prediction, then define $S_i$ as $S_1, S_2, \ldots, S_n$, where S is the score information and i is the ranking of the score within the prediction. Given a piece of data where A is its actual class and F is the forecast class, define $S_i$ to be the prediction score of class i by the classifier. In a traditional confusion matrix generation, F is the class i with the highest score. To generate and display a Top-K confusion matrix, according to an embodiment, first sort $\{S_i$ for all i$\}$, then if the score of A is in the highest K scores, then set F=A; otherwise, set F to be the class with the highest score. This set of data is then used to generate a confusion matrix. According to an embodiment, steps 515 and 530 may be performed by using at least one trained classifier to predict the classes for the data records. The prediction results consist of ranked classes with scores. In step 540, a mapping transformation may be applied as discussed herein if requested by a user.

In step 550, a determination is made whether the actual class to which the data belongs is one of the top K predicted classes as ranked by the score information; for example, assume a data item is predicted into classes A, B, C, D, and E, in that order as defined by the score information. If K=3, and the data item actually belongs to class C, then in step 560 the prediction is treated as accurate. For example, a record is generated indicating that the prediction was a match. According to an embodiment, if the example data item were the first data item classified in the confusion matrix, then the number 1 would be stored in the cell defined by the row containing the actual class C and the column containing the predicted class C. In the example, if K=3 and the data item actually belongs to class E, then in step 570 a record would be generated indicating the prediction was inaccurate. According to an embodiment, if the example data item were the first data item classified in the confusion matrix, then the number 1 would be stored in the cell defined by the row containing the actual class C and the column containing the predicted class A, as A is the predicted class with the highest score. In step 580, a confusion matrix is generated wherein each column represents a predicted class and each row represents an actual class, although this may be reversed.

According to an embodiment, the described approaches may be used to classify a question into one of several categories. For example, a website that allows users to pose questions which are then answered by other users may suggest a list of categories to a user within which the submitted question may be classified. In order to evaluate the effectiveness of the classifications, the described approaches may be used as a diagnostic tool whereby the actual class in which a question belongs is compared to a top K ranked list of classes into which the question may be predicted. If the value of K is one, then the only acceptable predictions, i.e., accurate predictions, are ones where the actual class to which the question belongs matches the class into which the question is predicted. If the value of K is 5, then as long as the question is predicted into one of the top five classes in the ranked list, then the prediction is treated as accurate.

In generating the confusion matrix for one such embodiment, if the predicted class for the question is in one of the top K classes in the ranked list of classes, then an entry is made in the cell of the confusion matrix defined by the row matching the actual class of the question (A) and the column of the list of predicted columns matching the actual column (F=A). If the predicted class for the question is not in one of the top K classes in the ranked list of classes, then an entry is made in the cell of the confusion matrix defined by the row matching the actual class of the question and the column matching the top ranked predicted class in the ranking of predicted classes. According to another embodiment, if the predicted class for the question is not in one of the top K classes in the ranked list of classes, then an entry may be made in the cell of the confusion matrix defined by the row matching the actual class of the question and the column matching the predicted class, as long as the predicted class does not match the actual class.

Hardware Overview

Figure 6:
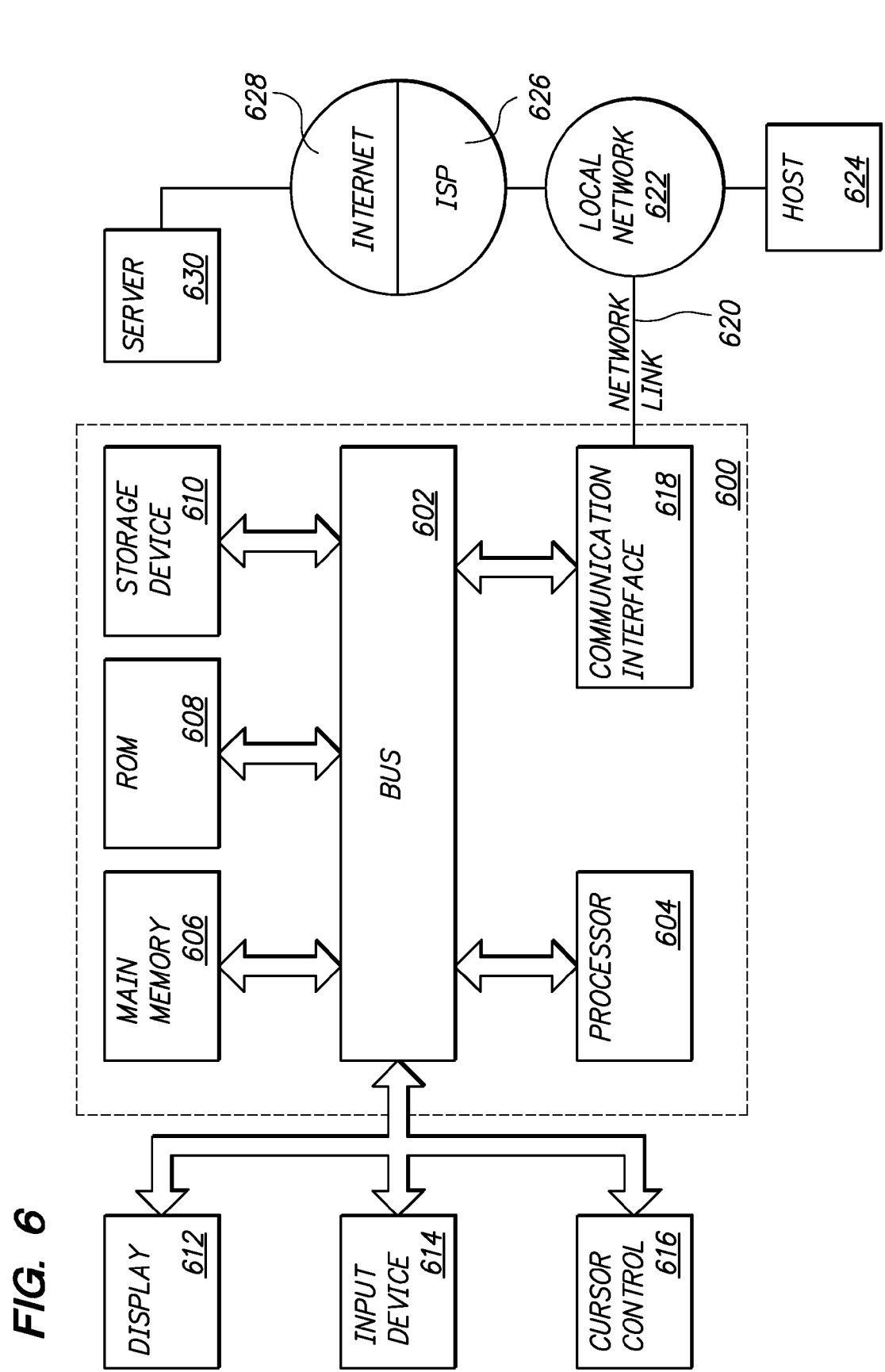
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for representing accuracy of a trained classifier in predicting classifications for a test set of data items wherein each data item of the test set has a designated actual class of a plurality of classes, the method comprising:
receiving the test set of data items and the designated actual class for each data item;
receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
comparing the designated actual class for the particular data item to each class of a top K predicted classes of the set of predicted classes as indicated by the rankings for the particular data item, wherein K is greater than one;
generating a confusion matrix;
in response to a determination that the designated actual class for the particular data item matches any of the top K predicted classes, then designating the trained classifier as accurate with respect to at least the particular data item by at least incrementing a particular cell of the confusion matrix identified by an actual class which is the designated actual class for the particular data item and a predicted class which is the designated actual class for the particular data item;
receiving user input directed to the particular cell of the confusion matrix;

in response to the user input, generating a listing of one or more data items corresponding to the particular cell of the confusion matrix; and wherein the method is performed by one or more computing devices.

2. The method of claim 1, wherein the ranked set of predicted classes is ranked based upon score information for each predicted class from the ranked set of predicted classes.

3. The method of claim 1, wherein at least one data item has more than one designated actual class.

4. The method of claim 1, further comprising in response to a determination that the designated actual class for the particular data item does not match any of the top K predicted classes, then designating the trained classifier as inaccurate with respect to the particular data item.

5. The method of claim 4, wherein:
the method further comprises generating a confusion matrix; and
designating the trained classifier as inaccurate with respect to the particular data item includes incrementing a particular cell of the confusion matrix that identified by an actual class which is the designated actual class for the particular data item and a predicted class which is a highest ranked predicted class according to the rankings.

6. A method for representing accuracy of a trained classifier in predicting classifications for a test set of data items wherein each data item of the test set has a designated actual class of a plurality of classes, the method comprising:
receiving the test set of data items and the designated actual class for each data item;
receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
comparing the designated actual class for the particular data item to each class of a top K predicted classes of the set of predicted classes as indicated by the rankings for the particular data item, wherein K is greater than one;
generating a confusion matrix comprising a plurality of cells, wherein each cell of the plurality of cells is identified by an actual class and a predicted class and each cell of the plurality of cells contains a value;
in response to a determination that the designated actual class for the particular data item matches any of the top K predicted classes, then incrementing the value of a first cell of the confusion matrix identified by the actual class being the designated actual class for the data item and the predicted class being the designated actual class for the data item;
in response to a determination that the designated actual class for the particular data item does not match any of the top K predicted classes, then incrementing the value of a second cell of the confusion matrix identified by the actual class being the designated actual class for the data item and the predicted class being a highest ranked predicted class according to the rankings; and
wherein the method is performed by one or more computing devices.

7. The method of claim 6, wherein the actual class identifies a column of the confusion matrix and the predicted class identifies a row of the confusion matrix.

8. The method of claim 6, further comprising receiving user input comprising a value for K.

9. The method of claim 8, further comprising automatically updating the confusion matrix to reflect the value of K and displaying an updated confusion matrix.

10. The method of claim 6, further comprising generating a visual indicator corresponding to a degree of prediction error.

11. The method of claim 6, further comprising:
receiving user input directed to a particular cell of the confusion matrix; and
in response to the user input, generating a listing of all data items corresponding to the particular cell of the confusion matrix.

12. The method of claim 11, wherein the user input is directed to a hyperlink displayed within the particular cell of the confusion matrix.

13. The method of claim 6, further comprising mapping categories in a taxonomy represented by the confusion matrix into another taxonomy represented by another confusion matrix.

14. A method for updating a confusion matrix on a graphical user interface, the method comprising:
receiving data that identifies a plurality of actual classes and predicted classes, wherein at least one of the actual classes is comprised of a plurality of subclasses;
causing to be generated and displayed on the graphical user interface a confusion matrix comprising rows, columns, and cells defined by the intersection of the rows and columns;
detecting user selection of a particular actual class from the plurality of actual classes and predicted classes; and
in response to the user selection of the particular actual class:
causing the confusion matrix to include at least one additional row representing a subclass of the particular actual class selected by the user;
generating an updated confusion matrix by updating the confusion matrix with the at least one additional row;
wherein updating the confusion matrix redistributes values from the row associated with the particular actual class to the at least one additional row;
causing the updated confusion matrix to be displayed on the graphical user interface; and
wherein the method is performed by one or more computing devices.

15. A non-transitory computer-readable medium for representing accuracy of a trained classifier in predicting classifications for a test set of data items wherein each data item of the test set has a designated actual class of a plurality of classes, the computer-readable medium storing instructions which, when processed by one or more processors, causes:
receiving the test set of data items and the designated actual class for each data item;
receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
comparing the designated actual class for the particular data item to each class of a top K predicted classes of the set of predicted classes as indicated by the rankings for the particular data item, wherein K is greater than one;

generating a confusion matrix;
in response to a determination that the designated actual class for the particular data item matches any of the top K predicted classes, then designating the trained classifier as accurate with respect to at least the particular data item by at least incrementing a particular cell of the confusion matrix identified by an actual class which is the designated actual class for the particular data item and a predicted class which is the designated actual class for the particular data item;
receiving user input directed to the particular cell of the confusion matrix;
in response to the user input, generating a listing of one or more data items corresponding to the particular cell of the confusion matrix.

16. The non-transitory computer-readable medium of claim 15, wherein at least one data item has more than one designated actual class.

17. The non-transitory computer-readable medium of claim 15, further comprising additional instructions which, when processed by the one or more processors, cause in response to a determination that the designated actual class for the particular data item does not match any of the top K predicted classes, then designating the trained classifier as inaccurate with respect to the particular data item.

18. The non-transitory computer-readable medium of claim 17, wherein:
the non-transitory computer-readable medium stores additional instructions which, when processed by the one or more processors, cause generating a confusion matrix; and
designating the trained classifier as inaccurate with respect to the particular data item includes incrementing a particular cell of the confusion matrix identified by an actual class which is the designated actual class for the particular data item and a highest ranked predicated class according to the rankings.

19. An apparatus for representing accuracy of a trained classifier in predicting classifications for a test set of data items wherein each data item of the test set has a designated actual class of a plurality of classes, the apparatus comprising a memory storing instructions which, when processed by one or more processors, causes:
receiving the test set of data items and the designated actual class for each data item;
receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
comparing the designated actual class for the particular data item to each class of a top K predicted classes of the set of predicted classes as indicated by the rankings for the particular data item, wherein K is greater than one;
generating a confusion matrix;
in response to a determination that the designated actual class for the particular data item matches any of the top K predicted classes, then designating the trained classifier as accurate with respect to at least the particular data item by at least incrementing a particular cell of the confusion matrix identified by an actual class which is the designated actual class for the particular data item and a predicted class which is the designated actual class for the particular data item;
receiving user input directed to the particular cell of the confusion matrix;
in response to the user input, generating a listing of one or more data items corresponding to the particular cell of the confusion matrix.

20. The apparatus of claim 19, wherein at least one data item has more than one designated actual class.

21. The apparatus of claim 19, wherein the memory stores additional instructions which, when processed by the one or more processors, cause in response to a determination that the designated actual class for the particular data item does not match any of the top K predicted classes, then designating the trained classifier as inaccurate with respect to the particular data item.

22. The apparatus of claim 21, wherein:
the memory stores additional instructions which, when processed by the one or more processors, cause generating a confusion matrix; and
designating the trained classifier as inaccurate with respect to the particular data item includes incrementing a particular cell of the confusion matrix identified by an actual class which is the designated actual class for the particular data item and a highest ranked predicated class according to the rankings.

23. A non-transitory computer-readable medium for representing accuracy of one or more trained classifiers in predicting classifications for a test set of data items wherein each data item of the test set has a designated actual class of a plurality of classes, the non-transitory computer-readable medium storing instructions which, when processed by one or more processors, causes:
receiving the test set of data items and the designated actual class for each data item;
receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
comparing the designated actual class for the particular data item to each class of a top K predicted classes of the set of predicted classes as indicated by the rankings for the particular data item, wherein K is greater than one;
generating a confusion matrix, wherein each cell of the confusion matrix is identified by an actual class and a predicted class and each cell contains a value;
in response to a determination that the designated actual class for the particular data item matches any of the top K predicted classes, then incrementing the value of a first cell of the confusion matrix identified by the actual class being the designated actual class for the data item and the predicted class being the designated actual class for the data item;
in response to a determination that the designated actual class for the particular data item does not match any of the top K predicted classes, then incrementing the value of a second cell of the confusion matrix identified by the actual class being the designated actual class for the data item and the predicted class being a highest ranked predicted class according to the rankings.

24. The non-transitory computer-readable medium of claim 23, wherein the actual class identifies a column of the confusion matrix and the predicted class identifies a row of the confusion matrix.

25. The non-transitory computer-readable medium of claim 23, further comprising additional instructions which, when processed by the one or more processors, cause receiving user input comprising a value for K.

26. The non-transitory computer-readable medium of claim 25, further comprising additional instructions which, when processed by the one or more processors, cause automatically updating the confusion matrix to reflect the value of K and displaying an updated confusion matrix.

27. The non-transitory computer-readable medium of claim 23, further comprising additional instructions which, when processed by the one or more processors, cause generating a visual indicator corresponding to a degree of prediction error.

28. The non-transitory computer-readable medium of claim 23, further comprising additional instructions which, when processed by the one or more processors, cause:
    receiving user input directed to a particular cell of the confusion matrix; and
    in response to the user input, generating a listing of all data items corresponding to the particular cell of the confusion matrix.

29. The non-transitory computer-readable medium of claim 28, wherein the user input is directed to a hyperlink displayed within the particular cell of the confusion matrix.

30. The non-transitory computer-readable medium of claim 23, further comprising additional instructions which, when processed by the one or more processors, cause mapping categories in a taxonomy represented by the confusion matrix into another taxonomy represented by another confusion matrix.

31. An apparatus for representing accuracy of one or more trained classifiers in predicting classifications for a test set of data items wherein each data item of the test set has a designated actual class of a plurality of classes, the apparatus comprising a memory storing instructions which, when processed by one or more processors, causes:
    receiving the test set of data items and the designated actual class for each data item;
    receiving, for a particular data item of the test set, rankings for a set of predicted classes of the plurality of classes, wherein the set of predicted classes is ordered within the rankings based on a prediction score assigned to each individual predicted class of the set of predicted classes by the trained classifier, the prediction score indicating a confidence of the trained classifier that the individual predicted class is the designated actual class for the particular data item;
    comparing the designated actual class for the particular data item to each class of a top K predicted classes of the set of predicted classes as indicated by the rankings for the particular data item, wherein K is greater than one;
    generating a confusion matrix, wherein each cell of the confusion matrix is identified by an actual class and a predicted class and each cell contains a value;
    in response to a determination that the designated actual class for the particular data item matches any of the top K predicted classes, then incrementing the value of a first cell of the confusion matrix identified by the actual class being the designated actual class for the data item and the predicted class being the designated actual class for the data item;
    in response to a determination that the designated actual class for the particular data item does not match any of the top K predicted classes, then incrementing the value of a second cell of the confusion matrix identified by the actual class being the designated actual class for the data item and the predicted class being a highest ranked predicted class according to the rankings.

32. The apparatus of claim 31, wherein the actual class identifies a column of the confusion matrix and the predicted class identifies a row of the confusion matrix.

33. The apparatus of claim 31, wherein the memory stores additional instructions which, when processed by the one or more processors, cause receiving user input comprising a value for K.

34. The apparatus of claim 33, wherein the memory stores additional instructions which, when processed by the one or more processors, cause automatically updating the confusion matrix to reflect the value of K and displaying an updated confusion matrix.

35. The apparatus of claim 31, wherein the memory stores additional instructions which, when processed by the one or more processors, cause further comprising generating a visual indicator corresponding to a degree of prediction error.

36. The apparatus of claim 31, wherein the memory stores additional instructions which, when processed by the one or more processors, cause:
    receiving user input directed to a particular cell of the confusion matrix; and
    in response to the user input, generating a listing of all data items corresponding to the particular cell of the confusion matrix.

37. The apparatus of claim 36, wherein the user input is directed to a hyperlink displayed within the particular cell of the confusion matrix.

38. The apparatus of claim 31, wherein the memory stores additional instructions which, when processed by the one or more processors, cause mapping categories in a taxonomy represented by the confusion matrix into another taxonomy represented by another confusion matrix.

39. A non-transitory computer-readable medium for updating a confusion matrix on a graphical user interface, the non-transitory computer-readable medium storing instructions which, when processed by one or more processors, causes:
    receiving data that identifies a plurality of actual classes and predicted classes, wherein at least one of the actual classes is comprised of a plurality of subclasses;
    causing to be generated and displayed on the graphical user interface a confusion matrix comprising rows, columns, and cells defined by the intersection of the rows and columns;
    detecting user selection of a particular actual class from the plurality of actual classes and predicted classes; and
    in response to the user selection of the particular actual class:
        causing the confusion matrix to include at least one additional row representing a subclass of the particular actual class selected by the user;
        generating an updated confusion matrix by updating the confusion matrix with the at least one additional row;
        wherein updating the confusion matrix redistributes values from the row associated with the particular actual class to the at least one additional row; and
        causing the updated confusion matrix to be displayed on the graphical user interface.

40. An apparatus for updating a confusion matrix on a graphical user interface, the apparatus comprising a memory storing instructions which, when processed by one or more processors, causes:
- receiving data that identifies a plurality of actual classes and predicted classes, wherein at least one of the actual classes is comprised of a plurality of subclasses;
- causing to be generated and displayed on the graphical user interface a confusion matrix comprising rows, columns, and cells defined by the intersection of the rows and columns;
- detecting user selection of a particular actual class from the plurality of actual classes and predicted classes; and
- in response to the user selection of the particular actual class:
  - causing the confusion matrix to include at least one additional row representing a subclass of the particular actual class selected by the user;
  - generating an updated confusion matrix by updating the confusion matrix with the at least one additional row;
  - wherein updating the confusion matrix redistributes values from the row associated with the particular actual class to the at least one additional row; and
  - causing the updated confusion matrix to be displayed on the graphical user interface.

* * * * *